Oct. 7, 1952          E. M. GREER          2,612,777
PUMP TESTING APPARATUS
Filed July 22, 1946          2 SHEETS—SHEET 1
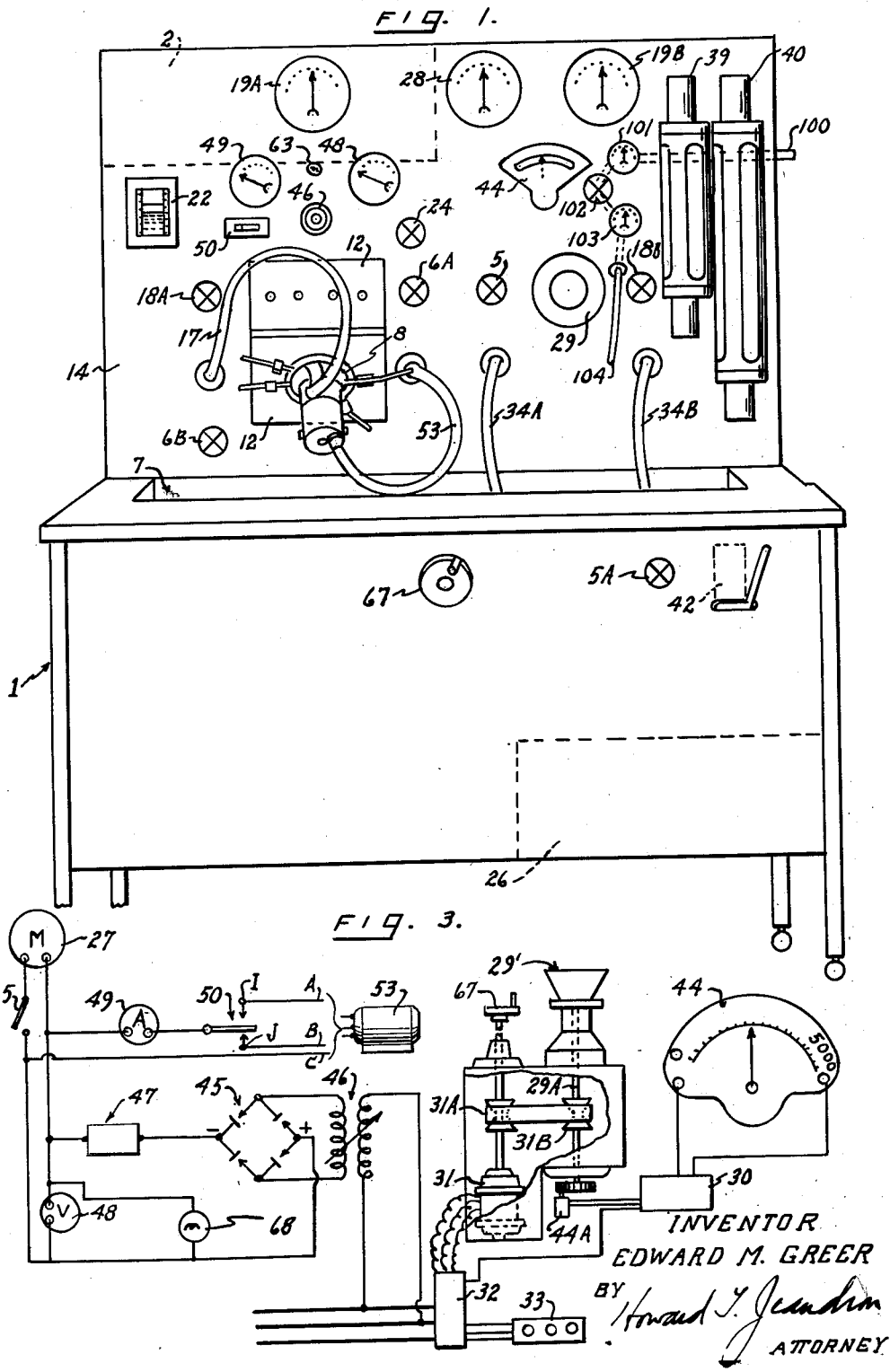
INVENTOR
EDWARD M. GREER
BY
Howard J. Jendrim
ATTORNEY

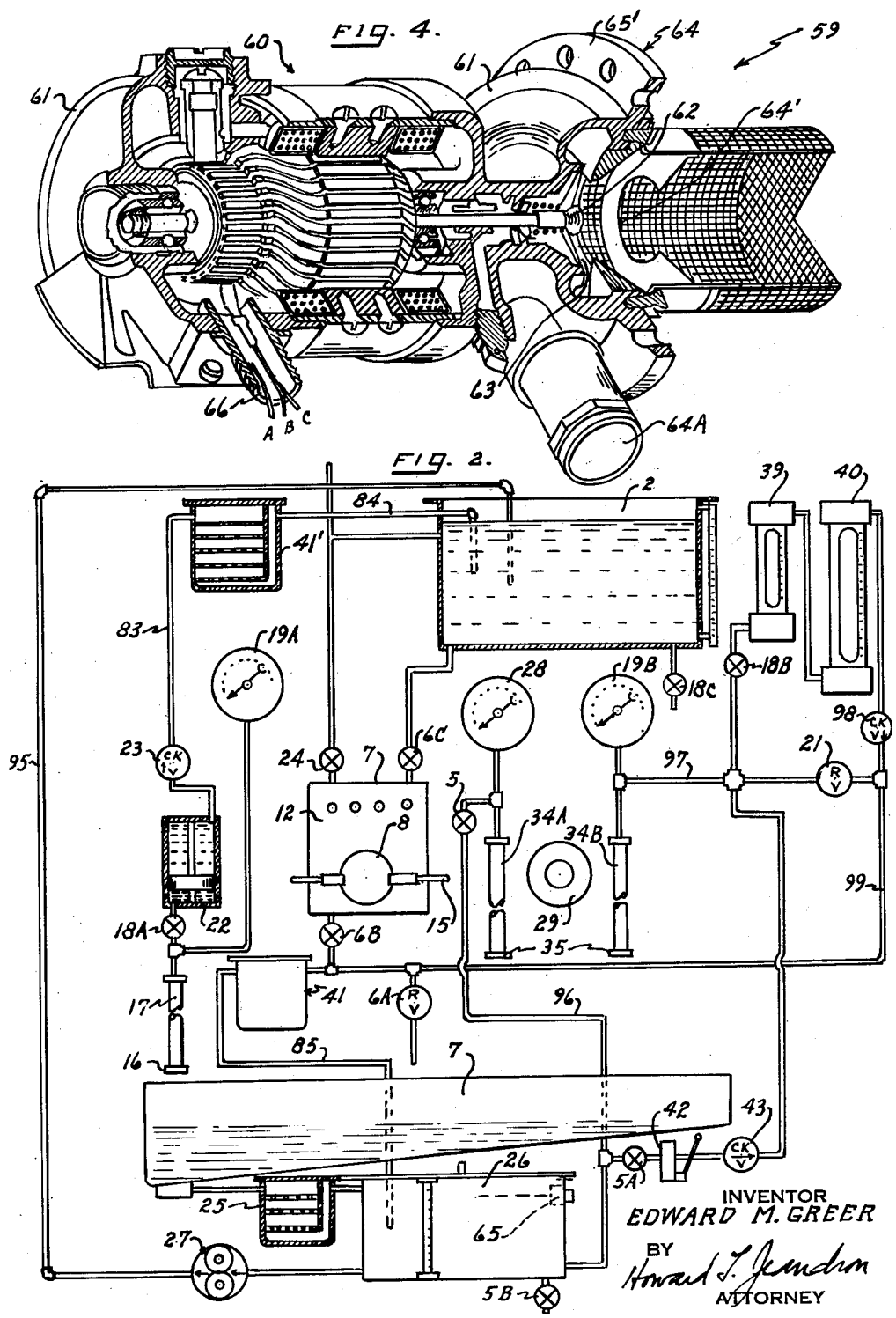

Patented Oct. 7, 1952

2,612,777

UNITED STATES PATENT OFFICE 2,612,777

PUMP TESTING APPARATUS

Edward M. Greer, West Hempstead, N. Y., assignor to Greer Hydraulics, Inc., Brooklyn, N. Y.

Application July 22, 1946, Serial No. 685,555

1 Claim. (Cl. 73—168)

This invention relates to an apparatus for testing electric motor driven centrifugal booster fluid pumps and more particularly to a test stand for checking the fluid pressures developed, the volume of fluid pumped during a given time interval and the amount of potential and current utilized by the electric motor to drive said pump during that same time interval.

In the past, fluid pumps have been tested for the pressure they will develop at a given R. P. M. and they have also been tested to ascertain the volume of fluid that may be displaced by said pump in a given time interval. The volume of fluid or rate of flow of fluid has been ascertained for varying rates of R. P. M. However, the potential utilized in driving the pump under any predetermined R. P. M. and interval of time has not been ascertained.

In the present invention, the test stand is primarily concerned with testing centrifugal fluid pumps used to supercharge or boost the fluid pressure in a fuel system, to develop greater and more positive vapor separating characteristics. It is essential that all such fluid pumps are accurately set to provide the predetermined fluid pressure as well as the predetermined fluid capacity during a given time interval and further the motor drive should not utilize more than a predetermined potential and current during the operation of the pump for said time interval.

To this end, it is an object of the present invention to provide a new and improved apparatus for testing booster pumps under actual working conditions.

A further object of this invention is the testing of pumps purporting to be of certain capacities in order to ascertain whether the same adhere to their standard of operation, and to provide for ready and accurate adjustment to compensate for errors disclosed by such testing apparatus.

A further object of this invention is the testing of pumps purporting to be of certain capacities in order to ascertain the fluid pressure developed at a given R. P. M. and the potential and current utilized during the operation of said pump for a given time interval.

A still further object of this invention is to provide a testing apparatus to provide universal mounting for the various types of submerged and external pumps to be tested on this apparatus.

A still further object of this invention is to provide a testing apparatus to not only test the characteristics of engine driven pumps, but to provide a variable speed drive for operating said pumps when under test.

A further object of this invention is to provide a testing apparatus which permits mounting of various types of pumps and in which a variable speed R. P. M. drive is provided to drive the pumps being tested at any R. P. M. within a predetermined range.

Another object of this invention is to provide a testing apparatus for fuel booster pumps to ascertain the fluid pressure developed at various R. P. M.'s as well as the volume fluid flow and the potential and current utilized during the test operation.

A further object of this invention is to provide a testing apparatus for fluid pumps to provide for controlling the suction side of the pump and accurately ascertaining the suction developed by the pump at various R. P. M. drives.

Other objects will become apparent from the following detailed description taken in connection with the accompanying drawings, wherein:

Fig. 1 is a front elevational view of the test stand,

Fig. 2 is a schematic illustration of the hydraulic circuit,

Fig. 3 is a schematic diagram of the electrical circuit of the test stand, and

Fig. 4 is a cross sectional view of one type of booster pump to be tested.

Although I have illustrated in the drawings and shall hereinafter describe in detail a preferred embodiment of the invention, it is to be understood that I do not intend to limit the invention to the particular form and arrangement shown.

In the form of the invention chosen for purposes of disclosure, the invention comprises a stand 1 illustrated in Fig. 1, in which a reservoir 2 is mounted in the upper portion of the stand, as indicated in dotted lines in Fig. 1, and a sump 7 is provided to collect all excessive fluid and overflow fluid during tests. The sump 7 is, in turn, connected to a filter 25, which is, in turn, connected to a reservoir 26 mounted in the lower portion of the stand, as schematically illustrated in Fig. 2.

A fluid compartment 12 is mounted below the reservoir 2 on a front panel 14 of the stand 1. A pump mounting plate 8 is affixed to the front of the tank 12. The test stand 1 is further provided with a pair of flow meters 39 and 40 mounted on the front panel 14 of the stand and each one is properly graduated to meter fluid in pounds per hour. The flow meters are connected by means of appropriate lines and valves to pass the fluid from a pump under test when mounted on plate 29 to the flow meters and from the flow meters through a filter 41 and back into another reservoir 26. The test stand is also provided with gauges 28 and 19B also connected to the pressure and suction hoses 34A and 34B, while the fluid from the hose line 34B is connected by means of a relief valve 21 to a return line and the return fluid will pass through a filter 41 and then back to the reservoir 26. The gauges 28 and 19B are mounted on the front panel of the stand 1, to be easily accessible. A pressure hose 17 and coupling 16 is also provided to be connected to the pressure port of an electric motor driven pump under test. This, in turn, is connected to a gauge 19A mounted on the panel 14 and is also connected through a shut-off valve 18A to a device 22, which is best described by its trade name Rotameter (in other words, the fluid velocity developed lifts a weight within the device to indicate on a calibrated scale the fluid flow being delivered by the pump under test), the fluid from the device 22 then passes through a check valve 23 and through a filter 41' back to the reservoir 2. It may be noted further that the stand is divided into two units, one for testing electric motor driven pumps and the other for testing engine driven pumps. That is, a pump mounted on mounting plate 8 is primarily to test the fluid pressure and fluid flow developed by an electric motor driven pump during a short manually operated test cycle of operation, whereas a pump mounted on mounting plate 29 is driven by a variable speed drive unit and may be checked for the suction developed, pressure developed and fluid flow. In the first test, fluid is withdrawn from reservoir 2 and may be pumped back into the same reservoir. Whereas, in the other test unit the engine driven pump to be tested during a run-in test will be mounted on a mounting plate 29 and will be driven by a variable speed drive unit 29'. In this instance, the pressure and suction ports of the pump are connected to the hose lines 34A and B and to the respective gauges 28 and 19B, indicated in Figs. 1 and 2. In the second test, fluid is withdrawn from the reservoir 26 and returned to the same reservoir, so that both tests may be run simultaneously. The stand 1 is also provided with a volt meter 48 and ammeter 49 that are connected in a circuit, as illustrated in Fig. 3, and are mounted on the front panel of the apparatus to make them easily accessible. The stand 1 is provided with a sump 7 (as described) located below the pump mounting plates 8 and 29 to insure all fuel leakage draining therein and then through filter 25 back into reservoir 26. The reservoir 26 has an electrically driven pump 27 connected to its lower most portion which is, in turn, connected to the main reservoir 2. The variable speed drive 29' is a conventional Reeves drive and is schematically illustrated in Fig. 3 and, as illustrated, indicates the method of obtaining a variance in the R. P. M. Although any means may be used to attain such variable speed drive, it is preferred to use a Reeves type drive which is well known in the art and may be of the type shown in the patent to Falk No. 2,410,155. A motor 31 provides the driving force to a variable effective diameter pulley 31A which, in turn, through a belt drive drives a second variable effective diameter pulley 31B which in turn drives the shaft 29A which drives the variable speed drive 29'. The manner of adjusting the R. P. M. of this drive is controlled by an external handle wheel 67. Turning this handle wheel 67 in one direction opens pulley 31A, while turning it in an opposite direction closes pulley 31A. In order that the R. P. M. of this drive may be checked, a magneto 44A is connected to the shaft 29A and the potential generated by 44A is supplied to an electrical resistance type tachometer 44, that is the potential developed by 44A is translated into R. P. M. on the scale of the tachometer, so that during a run-in test of a pump mounted on the mounting plate 29 which is driven by the face 29¹ of the variable speed drive as long as the fuel pump maintains a predetermined R. P. M., the meter 44 will check that R. P. M., but when the pump under load deviates from a predetermined R. P. M., the tachometer 44 will indicate the drop in R. P. M. Likewise, any excessive speed developed by the pump in operation will be indicated on the tachometer 44. Referring to the circuit illustrated in Fig. 3, it is apparent that a power source, such as a 220 volt A. C. supply may be connected for operating the motor 31 through a magnetic starter 32 under the control of a reversing switch 33. Reversal of the drive 29' is accompanied by reversal of the relay 30 to give a correct reading on the tachometer 44. The main source of potential is also connected to a transformer 46 having a variable control thereon so that a prescribed voltage may be selected. In this particular instance a maximum output of 28 volts is selected and is supplied to a rectifier 45 where it is converted into a D. C. source of potential. This, in turn, is connected to a circuit breaker 47 which may be of any suitable type and is diagrammatically represented by the block shown in Fig. 3. In the event an overload above 50 amps. is supplied through the rectifier 45, the circuit breaker 47 will break the current supplied to the motor. The circuit, as indicated, is in turn connected to the motor of the pump under test. A volt meter 48 is shunted across the line to indicate the voltage during the operation of the motor; also a lamp 68 is similarly shunted across the line with the voltmeter to be illuminated during operation of the motor. An ammeter 49 is connected to one side of the line and, in turn, is connected to a switch 50 so that current may be supplied through a cable assembly 53 to the booster pump. A switch 50 is provided with two contacts I and J, the contact I being connected to a lead A of the cable 53, which, in turn, is connected to a low speed coil of the motor 60, while the contact J is connected to a lead B of the cable 53, which in turn, is connected to a high speed coil of the motor 60. The opposite side of the potential supplied by the rectifier 45 is connected to a lead C of the cable 53.

Referring to Fig. 4, there is illustrated a centrifugal booster pump 59 in a partial cross sectional view to show the relationship of the integral parts. An electrically operated motor 60 is mounted in a housing 61 with a plug connection 66, and is mechanically connected by means of a spring pressed joint 62 to an impeller 63 of a centrifugal pump 64. The pump 64 is shown mounted within the same housing 61 and is provided with a strainer covered intake port 64' and a fluid discharge port 64A. The pump is provided with a fluid sealing flange 65' to facilitate mounting the pump for operation.

Referring to Fig. 2, the hydraulic system of the test stand indicated in Fig. 1, comprises the reservoir 2, the flow meters 39 and 40, the mounting plates 8 and 29, the pressure gauges 28 and 19A and 19B, the rotameter 22, the hoses 34A, 34B and 17 and appropriate filters 25, 41 and 41', as well as a sump 7, reservoir 26 and hand pump 42. A float switch 65 is installed in the upper portion of the reservoir 26 so that in the event the fluid in the reservoir rises above a maximum level, the pump 27 will be automatically operated to pump fluid from reservoir 26 to the main reservoir 2. It may be necessary during certain tests wherein there is a circulation from reservoir 26 through hand pump 42 to open valve 5A thus allowing the fluid to be circulated through check valve 43, relief valve 21, filter 41 and thus back to the reservoir 26. A low pressure relief valve 6A is provided to protect the flow meters 39 and 40 so that a back pressure will relieve through the valve 6A, this happens when the filter 41 clogs. A plurality of valves 18A and 18B and C, 6B and 6C, 24 and 5, 5A and 5B and lines connecting the apparatus are shown and will be described later. There are a number of clamps 15 illustrated in Figs. 1 and 2. These are ordinary rim clamps that are affixed to the mounting plates 8 or 29 and may be snapped open or closed. In a closed position they retain the rim 65 of the pump 64 (Fig. 4) in a tight sealed relationship with the face of the mounting plate.

The test stand 1 is prepared for operation as follows: The reservoirs 2 and 26 are filled with a fluid (which may be a particular fuel for which the pump under test is intended) of course, both reservoir 2 and 26 are properly vented (the vent of reservoir 26 is schematically illustrated, although actually it would be carried to a high point of the stand, as illustrated in Fig. 1). The stand is connected to a 220 volt, 3 phase source of potential, as illustrated in Fig. 3, that is, the variable transformer 46 is connected to the source of potential and that, in turn, is connected to a rectifier 45. This provides a D. C. supply through a circuit breaker 47. This D. C. source of potential is connected to both the voltmeter 48 and the motor 27. The connection to the motor 27 is through the automatic switch 65, which is situated in the lower reservoir 26. The D. C. source of potential is also connected through an ammeter 49 to a switch 50, which permits the selection of either of the two (low or high speed) coils of the motor 60 during a test operation. There are three leads A, B, and C through a cable 53, which in any test operation of a pump mounted on the mounting plate 8, must be connected to the motor 60 at its electrical coupling connection 66, where the same leads A, B, C are provided as a plug.

The stand being divided into two units, we will consider the operation of one unit in which a pump and motor, such as that illustrated in Fig. 4, are mounted to the test mounting plate 8 by means of quick connect clamps 15, thus the intake of the pump will be submerged within the chamber 12, illustrated in Figs. 1 and 2. The electrical cable being connected, as described, and the outlet port 64A of the pump must be connected to the coupling 16 of the pressure hose 17. Upon opening valve 6C fluid from the reservoir 2 will fill the chamber 12. Of course, valve 6B is closed and vent valve 24 may be open during the filling operation. The motor 60 is then ready for a test. In order that the motor 60 may be operated, the switch 50 must be closed against either the I or J contact. Thus, the motor will be operated, taking the fluid from the chamber 12 and the pressure fluid leaving port 64A will pass through hose 17 and the pressure will be indicated on gauge 19A. The shut-off valve 18A will be opened permitting this fluid to flow through the rotameter 22. The velocity of fluid flow will lift the weight within the rotameter, while passing through the rotameter. The rotameter is capable of indicating flows up to 3,600 pounds per hour. The fluid leaving the rotameter 22 will pass through a check valve 23, through the line 83, the filter 41', passing through a line 84 back to the reservoir 2. During this operation, the current utilized may be read on the ammeter 49. When this test is finished it is necessary to drain the fluid from chamber 12, therefore, valve 6C is closed, the vent valve 24 must be open, and the valve 6B will be opened to allow the fluid to drain through the filter 41 and thus through a return line 85 to the reservoir 26. In the event the fluid in the reservoir 26 overflows the switch 65, the switch 65 will be closed and the circuit to the motor 27 is completed. The motor 27 will then draw fluid from the reservoir 26 and force it through line 95 back to the reservoir 2. Of course, as soon as the fluid drops below the level of switch 65, the motor 27 will cease to operate.

Referring to the other portion of the stand, a variable speed drive 29', which is connected to the mounting plate 29, is provided with a motor 31, which is connected to a magnetic starter 32, the magnetic starter being connected to the 220 volt, three phase source of potential, already mentioned, and the magnetic starter 32 is, in turn, controlled by a reversing switch 33 so that the motor 31 will be operated in either direction under the control of the switch 33. The R. P. M. of the variable speed drive 29' is controlled by an external handle 67, as illustrated in Figs. 1 and 3. The variable speed drive 29', through its drive shaft 29A, is connected directly to a magneto 44A, which is, in turn, connected through a reversing relay 30 to a tachometer 44, which indicates the R. P. M. at which the drive 29' may be operated. This meter 44 is calibrated from zero to 5,000 R. P. M. and the variable speed drive 29' is capable of operating between 500 and 4,000 R. P. M. In this portion of the stand, which utilizes the variable speed drive, a different type of pump, that is, an engine driven pump, may be secured to the mounting pad 29 for test and, in such instance, the suction port of the pump will be connected to the hose 34A and the pressure port of the pump will be connected to the hose 34B by means of suitable couplings 35. Before the variable speed drive is started, valve 5 must be opened and valve 18B is also opened. Upon operating the variable speed drive the pump under test will draw fluid from reservoir 26, through line 96, through valve 5 and will indicate the suction developed on gauge 28. The fluid is drawn through hose 34A to the pump under test. The said pump will force the fluid under pressure through hose 34B recording the pressure developed on gauge 19B. The fluid will pass through line 97, through the shut-off valve 18B to a pair of flow meters 39 and 40. The flow meters 39 and 40 have been combined to give a greater degree of measurement over a large range of pressure. The two flow meters are capable of indicating pounds per hour from a minimum of 90 to a maximum of 5,400. The fluid flow on the smaller flow meter 39 may be recorded between 90 pounds and 900 pounds per hour, whereas, the fluid flow on the larger meter 40 may be recorded between 600 to 5,400 pounds per hour. The fluid passing through the flow meters 39 and 40 will pass through a check valve 98 and through line 99 to the filter 41, passing through the filter, through line 85 back to the reservoir 26. In the event the valve 18B were closed, the fluid passing through line 97 will pass through the relief valve 21 and through line 99 to the filter 41 and through line 85 back to the reservoir 26. In order that the flow meters 39 and 40 may be properly protected a low pressure relief 6A is introduced into or connected to the line 99. Thus, if the filter 41 should become clogged, the back pressure in line 99 will by-pass through the relief valve 6A emptying into the sump 7. Of course, any fluid which may be dumped directly into the sump 7, or as leakage from the mounting plates or the pumps under test dropping into sump 7, will pass through the filter 25 back to the reservoir 26. The pump mounted on mounting plate 29, of course, may be operated at any prescribed R. P. M. within the range of the variable speed drive 29', and the meter 44 may be checked to determine whether the pump remains at this predetermined R. P. M.

There are a few types of pumps to be tested that require an air pressure supply. Therefore, the stand, illustrated in Fig. 1, includes an air intake connection 100, which is connected to a gauge 101, passing through a variable pressure regulating valve 102 and, in turn, to a gauge 103 and a flexible hose connection 104. Thus, an air pressure supply external to the machine may be connected to the pipe 100 and this pressure will be indicated on gauge 101. Thus, an operator may regulate valve 102 to provide the desired pressure to be utilized on gauge 103. This air pressure passing through hose 104 to the pump under test. This particular air pressure supplied, as prescribed for certain pumps, is not connected with either of the tests already described.

From the foregoing, it will be apparent that the present invention provides a new type of test stand for fluid booster pumps. Such modifications and changes may be made in the structure, in the hydraulic system, or in the electric circuit of this test stand as fall within the scope of the appended claim.

What is claimed is:

In a testing apparatus for fluid pumps, a first and second fluid reservoir and a sump, a fluid compartment to mount one type pump so that it is submerged in the fluid, said first reservoir positioned above said compartment, a fluid line and shut-off valve between said first reservoir and said compartment to fill said compartment, by gravity, a fluid line and filter connecting said compartment with said second reservoir, said sump connected to said second reservoir, said sump and second reservoir being low enough to empty said compartment, an external fluid pressure line to connect the pump under test to a shut-off valve, a flow meter connected to said valve, a pressure gauge also connected to said pressure line, a source of potential and a switch to be connected to the motor of the pump under test, a voltmeter in said circuit, an ampere-hour meter in said circuit, means to close said circuit and operate said pump, and means to dump any excess fluid in said compartment into said sump and in turn into said second reservoir.

EDWARD M. GREER.

REFERENCES CITED

The following references are of record in the file of this patent:

UNITED STATES PATENTS

| Number | Name | Date |
| --- | --- | --- |
| 1,774,723 | Pachard | Sept. 2, 1930 |
| 2,062,173 | Haskins | Nov. 24, 1936 |
| 2,098,677 | Saballus et al. | Nov. 9, 1937 |
| 2,172,095 | White | Sept. 5, 1939 |
| 2,265,787 | White | Dec. 9, 1941 |
| 2,364,709 | Greer | Dec. 12, 1944 |
| 2,385,005 | Langer | Sept. 18, 1945 |
| 2,394,079 | Langer et al. | Feb. 5, 1946 |
| 2,410,155 | Falk | Oct. 29, 1946 |